United States Patent [19]
Shaw

[11] Patent Number: 5,630,625
[45] Date of Patent: May 20, 1997

[54] TANK TRUCK

[76] Inventor: Donald W. Shaw, 1309 Fairbourne Ct., Lansdale, Pa. 19446

[21] Appl. No.: 350,817

[22] Filed: Dec. 7, 1994

Related U.S. Application Data

[63] Continuation-in-part of Ser. No. 53,528, Apr. 23, 1993, abandoned.

[51] Int. Cl.$^6$ ................................................. B60P 3/22
[52] U.S. Cl. ........................ 280/838; 180/24.02; 180/209
[58] Field of Search .................................. 280/830, 837, 280/838, 839, 81.1, 405.1; 180/209, 24.02

[56] References Cited

U.S. PATENT DOCUMENTS 3,191,961  6/1965  Brennan et al. ...................... 280/81.1
4,325,560  4/1982  Hirvonen ................................ 280/838
4,911,330  3/1990  Vlaanderen et al. .................... 280/838

*Primary Examiner*—Kevin Hurley
*Attorney, Agent, or Firm*—Frederick J. Olsson

[57] ABSTRACT

Fuel delivery tank-truck has rear and forward tanks which can independently receive, store and discharge fuel and a pair of tag wheels located to the rear of the drive wheels underneath the rear tank. The rear tank occupies the area conventionally occupied by the hose reel assembly which is moved forward adjacent the driver's cab. The truck leaves the fuel depot with both tanks full and with the tag wheels down. When the rear tank empties during the course of fuel delivery, a sensor in the rear tank is activated. This results in the automatic or manual set up of the system for making the fuel in the front tank available for delivery and for the raising of the tag wheels.

24 Claims, 5 Drawing Sheets

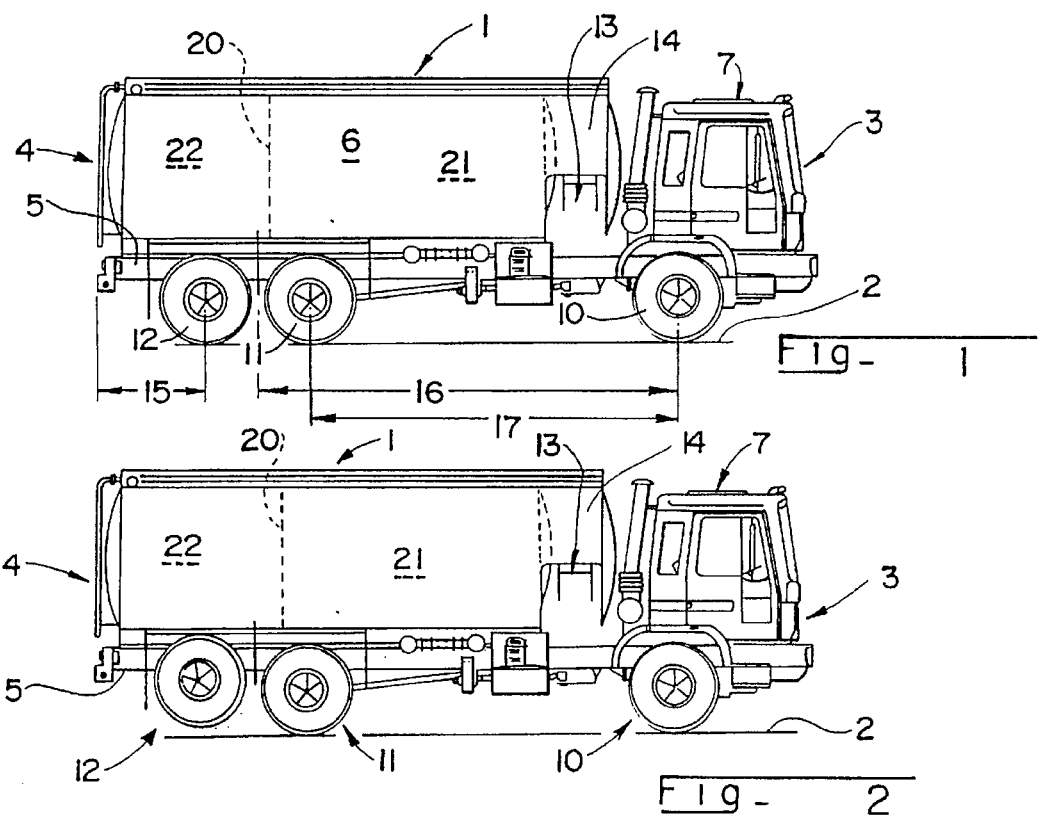
Fig. 1
Fig. 2
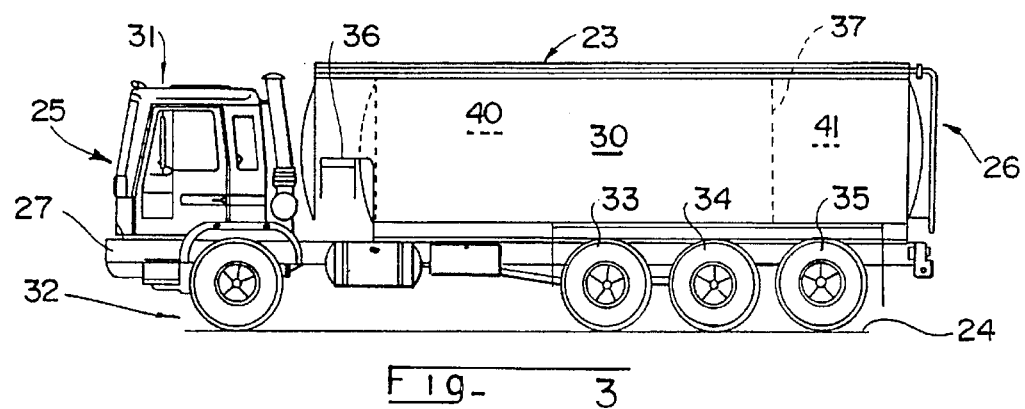
Fig. 3
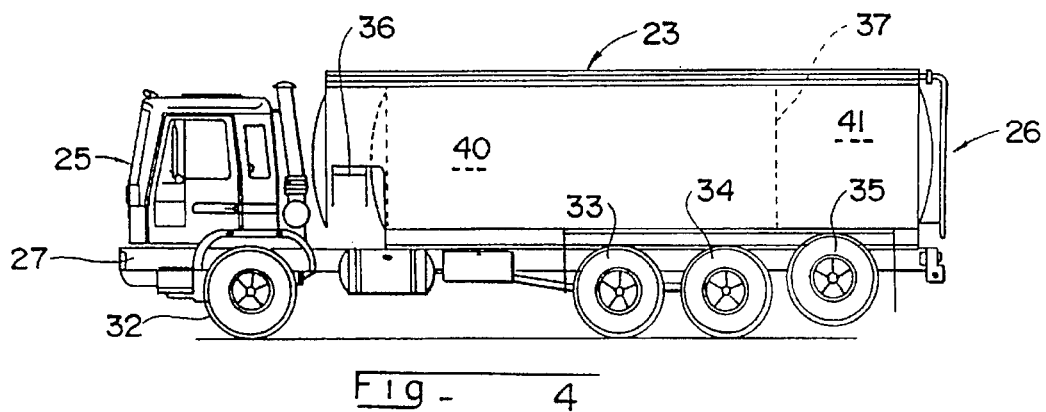
Fig. 4

5,630,625

1
TANK TRUCK

This application is a continuation-in-part of my application Ser. No. 08/053/528 filed Apr. 23, 1995 and now abandoned.

This invention relates to tank trucks adapted to be driven over roads to deliver refined petroleum products such as heating oil to homes and apartments, and gasoline to business establishments, service stations and the like.

Tank trucks used for delivering refined petroleum products are conventionally made in 2800 and 4200 gallon sizes and in some instances even larger sizes. The overall length of a 2800 gallon truck is about 23–26 feet depending on whether the cab is to the rear or is over the engine. The overall length of a 4200 gallon truck is about 27–31 feet. For load support, the larger size trucks must have a tandem configuration in the rear or in addition to the drive wheels there must be idler wheels whose primary function is to support the load. In such tandem configuration, the idler wheels normally remain in contact with the road surface even when the tank has been emptied.

In trucks of the kind in question it is conventional to locate the hose reel assembly under a canopy at the rear of the tank and spaced from the rear most wheel (drive or idler) so that there is a substantial overhang of the tank structure.

Further, in a conventional 2800 gallon tank truck, the wheel base is approximately 190 inches and with the 4200 gallon tank truck the wheel base is increased and is approximately 220 inches.

It is the view of the trade that economy of delivery is best obtained by the use of a larger gallon capacity truck mainly because deliveries can be made farther from home base and more deliveries can be made before returning to home base. However, this is tempered by the increase in user fees and by the increase in maintenance costs due to the additional axles and wheels and the fact that the tires of these idler wheels are in contact with the road surface regardless of the amount of product in the tank.

In the conventional larger gallon capacity truck maneuverability is decreased as compared to a smaller gallon capacity size. In the smaller size, the pivot point for turning is in a vertical plane containing the drive wheel axis whereas in the larger gallon capacity configuration the pivot point is moved rearwardly to a vertical plane midway between the axis of the drive and idler wheels. This increases the turning radius making wider turns necessary.

The invention eliminates many of the problems associated with conventional tank trucks and in doing so provides substantial improvements in delivery capabilities and in maneuverability both of which result in much needed savings in cost to the truck operator. According to the invention, the tank means is divided into front and rear liquid or product carrying compartments which are independently filed and drained. The tank means mounts a delivery hose reel assembly at its forward end behind to the driver's cab. Further, according to the invention the tank means is supported by a pair of front steering wheels and at the rear is supported by single or dual drive wheels and lift or tag wheels which are located between the rear end of the tank and the drive wheels. The tag wheels are capable of being lowered to engage the roadway surface and cooperate with the drive wheels to support the tank or to be raised away out of engagement with the roadway surface.

The principle object of the invention is to provide a tank truck which can be converted from a rear tandem axle configuration to a rear single axle configuration and visa versa as a function of the amount of liquid or product stored in the tank.

2

Another principle object of the invention is to provide a tank truck which can be automatically converted or alternatively driver converted from a rear tandem axle configuration to rear single axle configuration during the period of the delivery run as a function of the fluid or product in the tank means.

Another object of the invention is to provide a tank truck of the kind in question having a two compartment tank and a retractable tandem axle which can be adapted to convert the truck from a high capacity configuration to a lower capacity configuration.

Another object of the invention is to provide a tank truck of the kind in question having a multi compartment tank and a retractable tag axle which can be adapted to convert the truck from a multi axle gallon configuration to a tandem or single axle gallon configuration.

Another object of the invention is to provide a tank truck of the kind in question which can be converted during the delivery process as between high and low capacity configuration so as to adapt the truck to the load and the maneuverability requirements for both suburban and city deliveries.

Another object of the invention is to provide a tank truck of the kind in question having a multi compartment tank with a retractable tag axle and having the hose reel assembly at the front of the tank, the axle retraction converting the truck from a high gallon capacity to a low gallon capacity with a shorter wheel base and a rear overhang substantially the same as the overhang in conventional tank trucks with a rear mounted hose reel assembly.

Another object of the invention is to provide a tank truck of the kind in question which can be automatically converted or alternatively driver converted from a high capacity configuration to a lower capacity configuration and in the latter configuration the tank overhang not exceeding 124 inches.

The invention will be described in connection with FIGS. 1–14 a brief description of which appears below. On some of these drawings, added identifying terms have been added for certain components and adjacent the term is a number (in parenthesis) which is the number referred to in the description. The purpose of the foregoing is to enhance the understanding of the invention.

FIG. 1 is a side elevational view of a single drive axle tank truck incorporating the invention, the lift or tag wheels being in engagement with the roadway surface;

FIG. 2 is a side elevational view of the tank truck of FIG. 1, the tag wheels being lifted away from the roadway surface;

FIG. 3 is a side elevational view of a tandem or dual drive axle tank truck incorporating the invention, the tag wheels being in engagement with the roadway surface;

FIG. 4 is a side elevational view of the tank truck of FIG. 3, the tag wheels being lifted away from the roadway surface;

Figure 5:
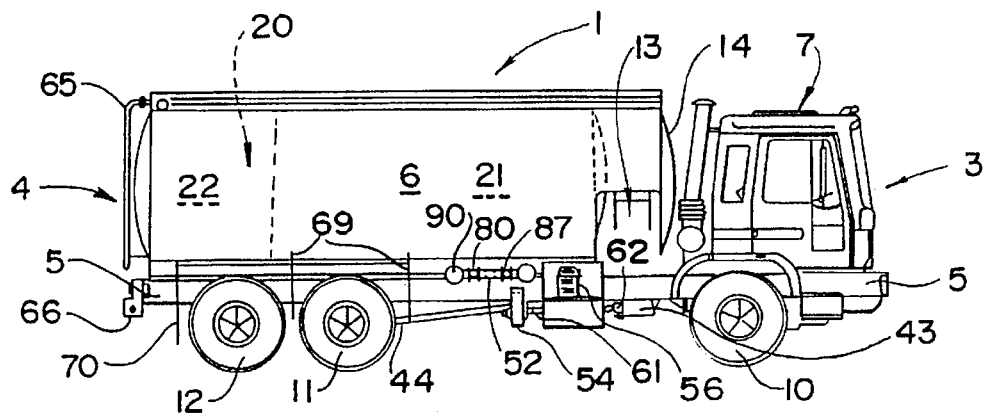
FIG. 5 is a side elevational view of a single drive axle tank truck incorporating the invention and employing a standard or mechanical pumping system for pumping product from the tanks to the delivery hose.

In FIG. 1, a tank truck 1 is disposed on a surface 2. The truck has a main support frame means extending as between the front 3 and rear 4 of the truck, part of the frame means being noted at 5. The frame means mounts the tank 6, driver's cab 7, steering wheels 10, single drive wheels 11, and tag wheels 12. The product delivery hose reel assembly noted at 13 mounts the delivery hose not shown.

In FIG. 2, the parts noted above are designated by the same numerals. The difference between the trucks of FIGS. 1 and 2 is that in FIG. 2, the tag wheels have been lifted clear of the surface 2.

In FIGS. 1 and 2 it will be observed that the hose reel assembly 13 is located at the front of the tank 6 within the canopy section 14. Also, it will be observed that the overhang of the tank is minimal. In the configuration shown, the overhang is approximately 103 inches as noted by the arrow 15. This is just about the same as the overhang in a conventional tandem configuration truck with a rear mounted hose reel assembly. In FIG. 1, with the tag wheels 12 in contact with the road the wheels base is approximately 195 inches as noted by the arrow 16. The wheel base is shortened to approximately 170 inches (arrow 17) when the tag wheels are raised.

The tank means of FIGS. 1 and 2 is divided into front and rear tank section means or two separate independent compartments by a bulk head located in a position indicated by the dotted line 20. The forward compartment or front tank section means is located in the area noted at 21 and the rear compartment or rear tank section means is located in the area noted at 22.

The bulkhead is located between the tag and drive wheels 11 and the tag wheels 12 so that the rear compartment is disposed over the tag wheels 12. In the 4200 gallon configuration the capacity of the forward compartment 21 is 2800 gallons and the capacity of the rear compartment is 1400 gallons. With product in both compartments, the load is supported by both drive wheel 11, the tag wheels 12 as shown in FIG. 1. When product has been pumped out of rear compartment 22 and the tag wheels are lifted (FIG. 2) and the product load is front tank 21 and is supported by drive wheels 11. Naturally, it will be understood that the steering wheels 11 perform a load carrying function.

From the above description, it will be evident that the truck of FIG. 1 when both tanks compartment are full has a 4200 gallon product capacity and that the truck is converted to a 2800 gallon capacity by emptying the product in rear compartment 22 and lifting the tag wheels 12.

As indicated previously when the truck is converted to 2800 gallon capacity the overhang approximates the overhang in a conventional 2800 gallon truck with rear mounted hose reel assembly.

The truck configurations shown in FIG. 3 and 4 illustrated the invention as applied to a 6000 gallon capacity truck.

The truck 23 is disposed on a surface 24 and includes a main support frame means extending it between the front 25 and the rear 26, part of the frame means being noted 27. The frame means mounts the tank 30, driver's cab 31, steering wheels 32, two pair of drive wheels 33 and 34 and tag wheels 35. The product delivery hose reel assembly noted at 36 mounts the delivery hose not shown.

In FIG. 4 the parts noted about are designated by the same numerals. The difference between the trucks of FIG. 3 and 4 is that in FIG. 4 the tag wheels have been lifted clear the surface 24.

The tank 30 of FIGS. 3 and 4 is divided into two separate independent compartments by a bulkhead located in a position indicated by the dotted line 37. The forward compartment is located in the area noted at 40 and the rear compartment is located in the area noted at 41.

The bulkhead is located between the tag wheels 35 and the rear drive wheels 34 so that the rear compartment is disposed over the tag wheels 35. In the 6000 gallon configuration the capacity of the forward compartment 40 is 4000 gallons and the capacity of the rear compartment is 2000 gallons.

With product in both compartments, the load is supported by both the drive wheels 33 and 34 and the tag wheels 35. When the product is pumped out of the rear compartment 41, the tag wheels 35 are lifted (FIG. 4) and the drive wheels 33, 34 assume the load.

The remarks made in connection with the tank truck of FIGS. 1 and 2 with respect to overhang, change in wheel base and change in capacity are applicable to the tank truck of FIG. 3 and 4.

Figure 6:
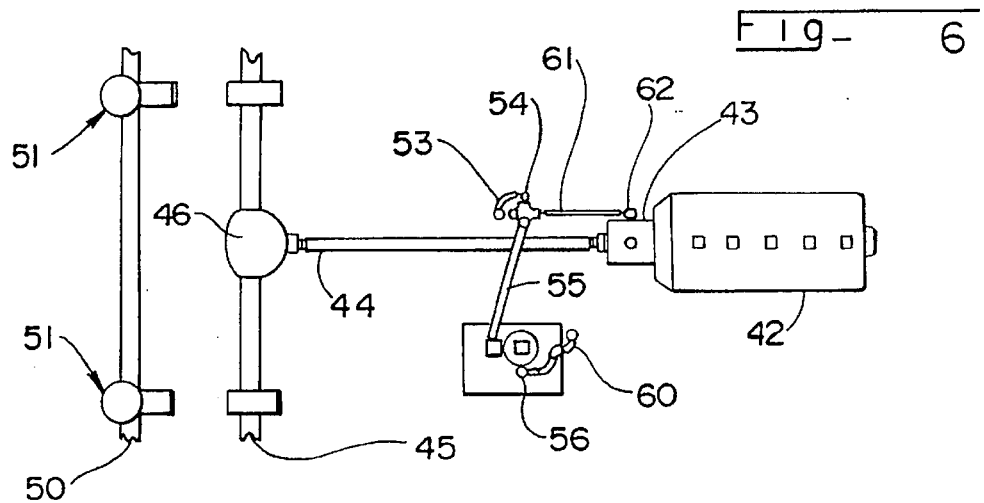
FIG. 6 is a plan schematic view of the standard pumping system as employed in the truck of FIG. 5.
Figure 7:
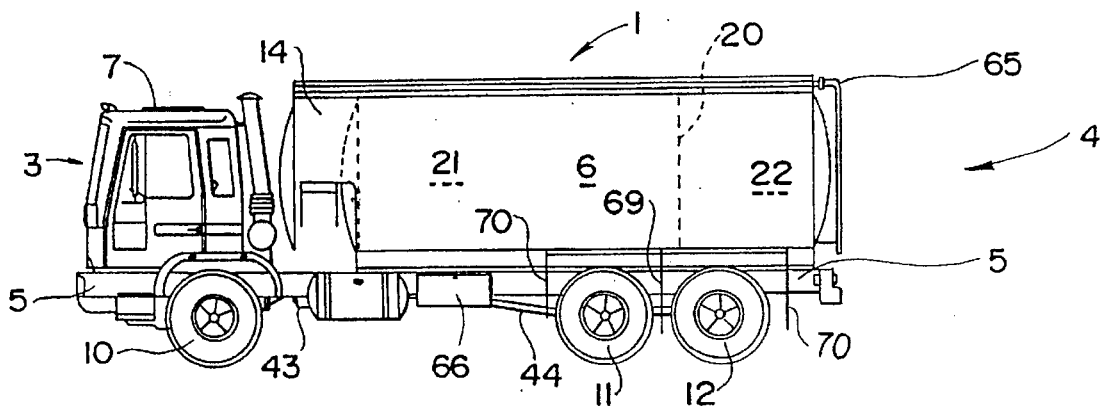
FIG. 7 is a side elevational view taken on the opposite side of the tank truck of FIG. 6.

In FIGS. 5 and 7 also illustrate the truck of FIGS. 1 and 2 and are used here for further describing the invention. The numerals used in FIG. 1 and 2 are also employed in FIG. 5 and 7 for identifying corresponding parts. FIG. 7 shows the opposite side of the truck of FIG. 5. FIG. 6 schematically shows the mechanical or standard system for pumping fluid from the front and rear compartments in the tank to the delivery hose on the hose reel assembly.

Referring to FIG. 6, the engine for the truck is idicated at 42, the transmission at 43, and the drive shaft at 44. These same parts are shown in FIG. 5 and 6 except for the engine 12 which is supported by the frame means on the underside of the cabin 7.

Shown in FIG. 6 is the drive axle 45 for the truck. This is connected to the frame means 5 and to the drive shaft 44 by the universal 46. The drive axle 45 supports the drive wheels 11.

Also, shown in FIG. 6 is the lift axle 50 which supports the tag wheels 12. The lift axle is adapted to be moved as between the up and down positions as by the left mechanism 51 which will be described later.

A pumping system pulls product from the front and rear compartments and transfers the products to the delivery hose in the hose reel assembly 13. Most of this system is shown in FIGS. 5 and 6.

The inlets on the manifold means 52 are respectively connected by piping (noted later) to compartments 21 and 22. The outlet on the manifold is connected by pipe 53 to a pump 54. The pump 54 passes fluid thru a pipe 55 to a product meter means 56 and thence via a pipe 60 to the product delivery hose.

The pump 54 is driven by a pump drive shaft 61 which in turn is driven by a power take off 62 operated from the transmission 43.

Some of the parts noted in connection with FIGS. 5 and 6 are shown in FIG. 7. This figure also shows the location of the truck fuel tank 63 and tool box 64.

Other parts not as yet referred to appear in FIGS. 5 and 7. These are the ladder 65, bumper 66 and mud guards 70.

Fluid from the compartments 21 and 22 may be pumped to the product delivery hose by a hydraulic system rather then a standard or mechanical system. In such cases a hydraulic pump, a hydraulic reservoir, and a hydraulic motor replace the corresponding mechanical items. Such a hydraulic pump is driven by the power take-off 62 to pump fluid from the reservoir to a hydraulic motor which in turn drives the product pump 54.

With the above in mind I will now comment on the structure of the tank 6 and the pipe connecting the manifold and the compartments 21 and 22.

Figure 8:
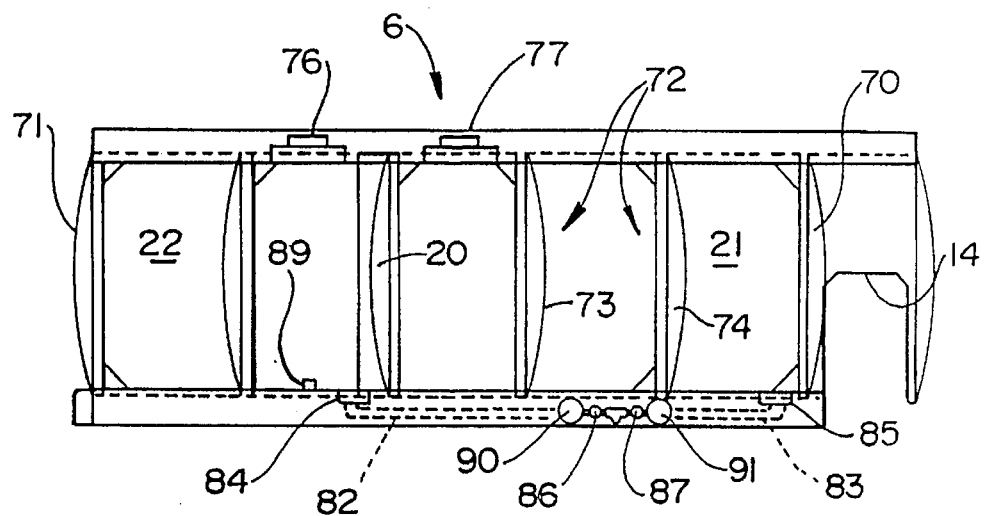
FIG. 8 is a side view of the tank of FIG. 5 with the side of the tank partially broken away to illustrate certain inner structure.
Figure 9:
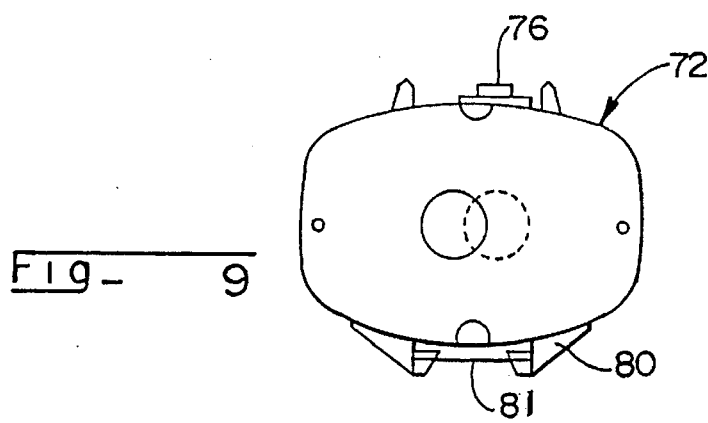
FIG. 9 is an end view of the tank of FIG. 8 taken in a direction looking toward the right in FIG. 8.

Referring to FIG. 8 the tank 6 is shown in side elevation with part of the outer shell or skin 72 removed to expose the interior. The front and rear ends of the tank are indicated at 70 and 71 which in conjunction with the outer skin 72 provide a fluid enclosure. The bulkhead 20 is a solid member joined to the skin 72 and divides the interior into the compartments 21 and 22. The compartment 21 has a pair of perforated splash baffles 73 and 74 and the compartment 22 has a single perforated splash baffle 75. The compartment 20 is filled through the top inlet 76 and the compartment 21 is filled through the top inlet 77. As noted, the skin 72 forms the canopy section 14.

The skin 72 is connected to a sill means 80 which is supported on the truck frame means. The sill means 80 is formed with a bottom channel 81 which runs the length of the tank. The channel 81 provides a passageway for the rear tank discharge pipe 82 which runs to the manifold 52, for the front tank discharge pipe 83 which runs to the manifold 52, and for part of the pump inlet pipe 53. The unit depicted by the circle 84 is pump/valve assembly or rear tank valve connected to rear tank 22 and receives product therefrom. The pipe 82 is connected to assembly 84 to receive product therefrom. The unit depicted by the circle 85 is a pump/valve assembly or front tank valve connected to the front tank 21 and receives product therefrom. The pipe 83 is connected to the assembly 85 to receive fluid.

Figure 10:
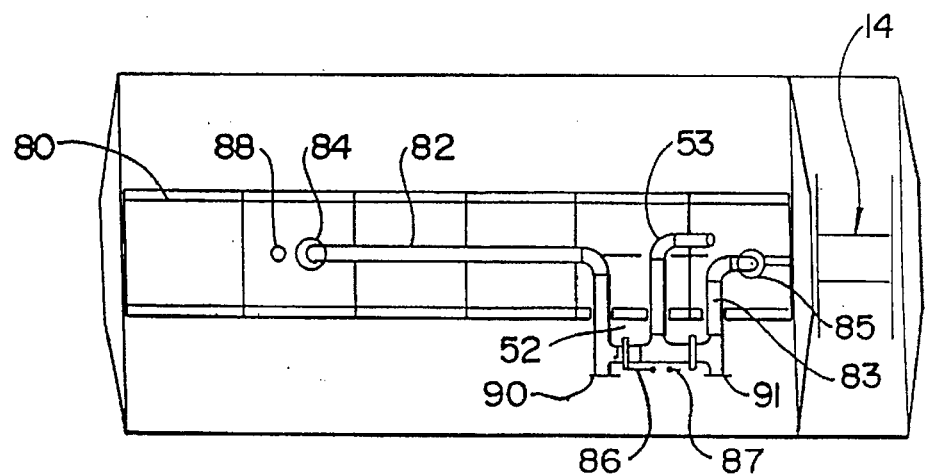
FIG. 10 is a bottom view of the tank of FIG. 8.

Referring to FIG. 10, the product from pipe 82 goes through the manifold 52 to the pipe 53 and the flow is controlled by a manually settable butterfly valve 86. The product from pipe 83 goes through the manifold 52 to pipe 53 and this flow is controlled by the manually settable butterfly valve 87.

The manifold 52 includes a pair of blank flanges 90 and 91 which are respectively disposed adjacent the butterfly valves 86 and 87.

The unit represented by the circle 88 is a pipe coupler joined to the bottom of the tank below the rear compartment 22. The coupler mounts a fluid sensor in the form of float switch 89 (FIG. 8) which projects up into compartment 22 and senses the amount of product in the rear tank 22.

Float switches are conventional and include a pair of fixed contacts which are opened and closed by a make/break bar connected to a float which floats in the product. When the compartment 22 is substantially emptied of product so that the level is adjacent the bottom, the bar opens the contacts. When the product level is high the float moves the bar to the close the contacts.

The position of the butterfly valves 86 and 87 and the blank flanges 90 and 91 are also noted in FIG. 5.

As indicated heretofore, the wheel assembly means which supports the tank means by a tandem axle configuration or alternatively by a single axle configuration includes drive wheels 11, the drive axle 45 the tag wheels 12, tag axle 50 and the lift mechanism 55.

Some of the details of the lift mechanism will now be commented on. Lift mechanisms per se have long been used for lifting wheels away from the road surface or positioning the wheels in contact with the road surface and functioning to support the load.

There are several manufactures of lift mechanism and the mechanism which I prefer to use is manufactured by Neway Corp. P.O. 425, Mushegon, Mich. 49443, a subsidiary of the Lear Truck Products Corp. referred to as the ART Series with coil spring lift. Various Neway catalogs, specification sheets, maintenance manuals and the like show the mechanical structure of such lifts in great detail and provide detailed sketches of the air and electrical systems for these mechanisms.

Figure 11:
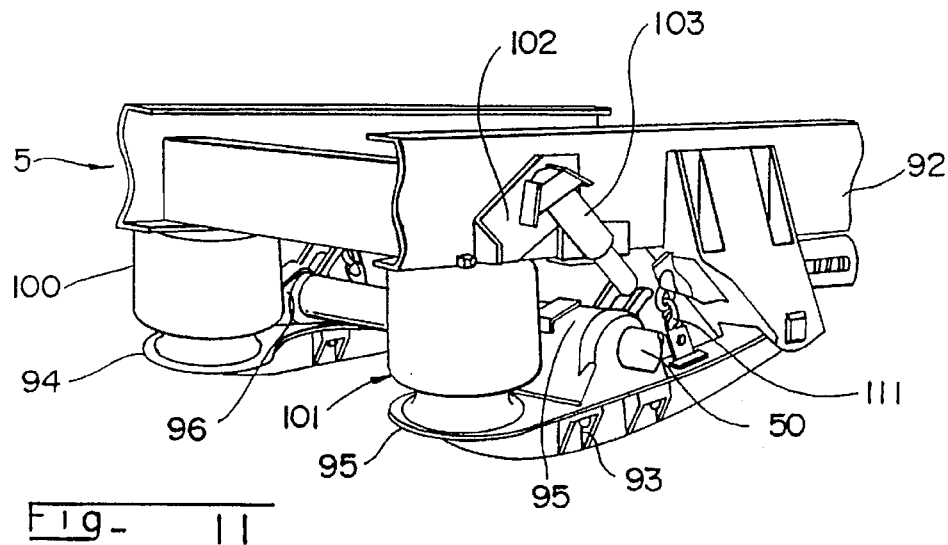
FIG. 11 is a fragmentary perspective view of mechanism employed in the tank truck of FIG. 5 for supporting the tag wheels in a down condition in contact with the road surface (as in FIGS. 1 and 5) alternatively in an up condition wherein the tag wheels are spaced above the road surface (as is FIG. 2)
Figure 12:
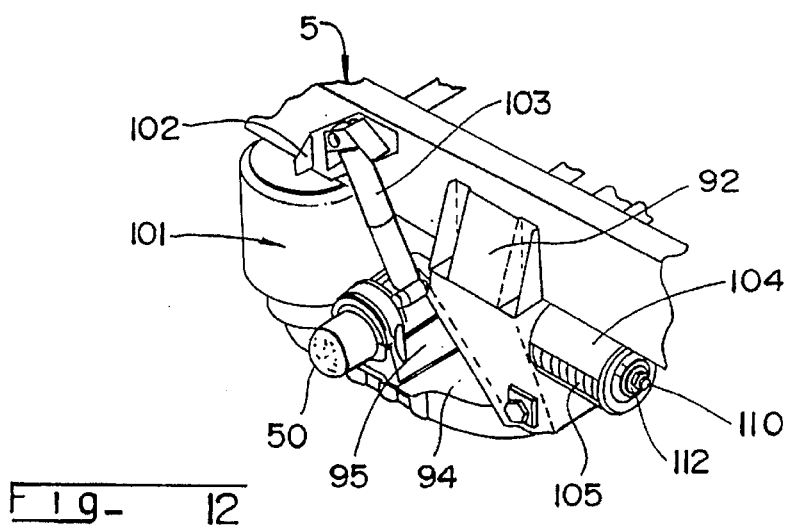
FIG. 12 is a fragmentary perspective view further illustrating the mechanism of FIG. 11.
Figure 13:
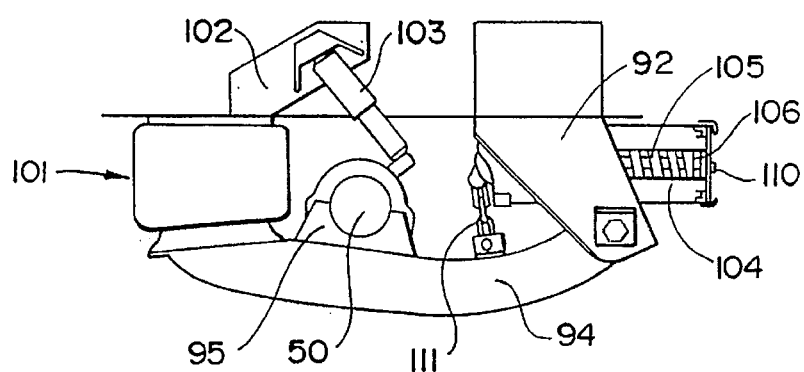
FIG. 13 is a fragmentary side elevational view further illustrating the mechanism of FIG. 11.

For present purposes I will show the general overall structure using the perspective views of FIGS. 11 and 12 and the elevational view of FIG. 13. The lift mechanism has a left and a right hand section mounted on opposite sides of the frame means. The components of each section are essentially identical.

In FIG. 11, the frame 5 mounted a frame bracket assemblies one of which is shown at 92. A beam is pivotally connected to the bracket 92. An identical beam 94 is connected to the other frame bracket.

The lift axle 50 is supported on the beams 93 and 94 by the hold down means 95 and 96.

On opposite ends of the beams 93 and 94 are the air spring assemblies 100 and 101. The lower end of each assembly is secured to its beam by bolt means not shown. The upper end of each assembly is secured to the frame by the spring brackets one of which is shown at 102. Connected between each of the spring brackets 102 and its lift axle hold down a shock absorber one of which is indicated at 103.

As will be evident from an inspection of FIG. 13, when the air spring 100, 101 are inflated, the load on the frame is transferred to the lift wheels via the frame brackets 92, air spring brackets 102, air spring 100–101, beans 93–94 and axle hold down 95–96.

When air is exhausted from the air springs 100–101 the lift wheels are adapted to be lifted away from the road surface by a mechanical spring arrangement.

Each of the frame brackets 92 mounts a spring housing 104. Inside of each spring housing is a coil spring 105. On the outer end of the coil spring is a cup 106 set up to be pushed in an outward direction by the coil spring 105. A threaded push rod 100 extends thru the cup and along the axis of the spring.

The inner end of the rod 110 is connected to a lift chain 111 which in turn is connected to the beam. Below the point of connection between push rod 110 and chain 111 is a roller means engaged by the chain and providing for ease of lineal movement of the chain.

The outer end of the push rod carries an adjusting nut assembly 112 which is used to adjacent to the compression of the spring.

As will be evident, when the air is exhausted from the air spring 100–101, the coil spring functions to push the rod 110 outwardly which pulls the chain 111 upwardly. This causes the beams to pivot upwardly and lift the tag wheels from the road surface.

The shock absorber are used to prevent sudden motion of the beams upon exhausting the air in the air spring.

Figure 14:
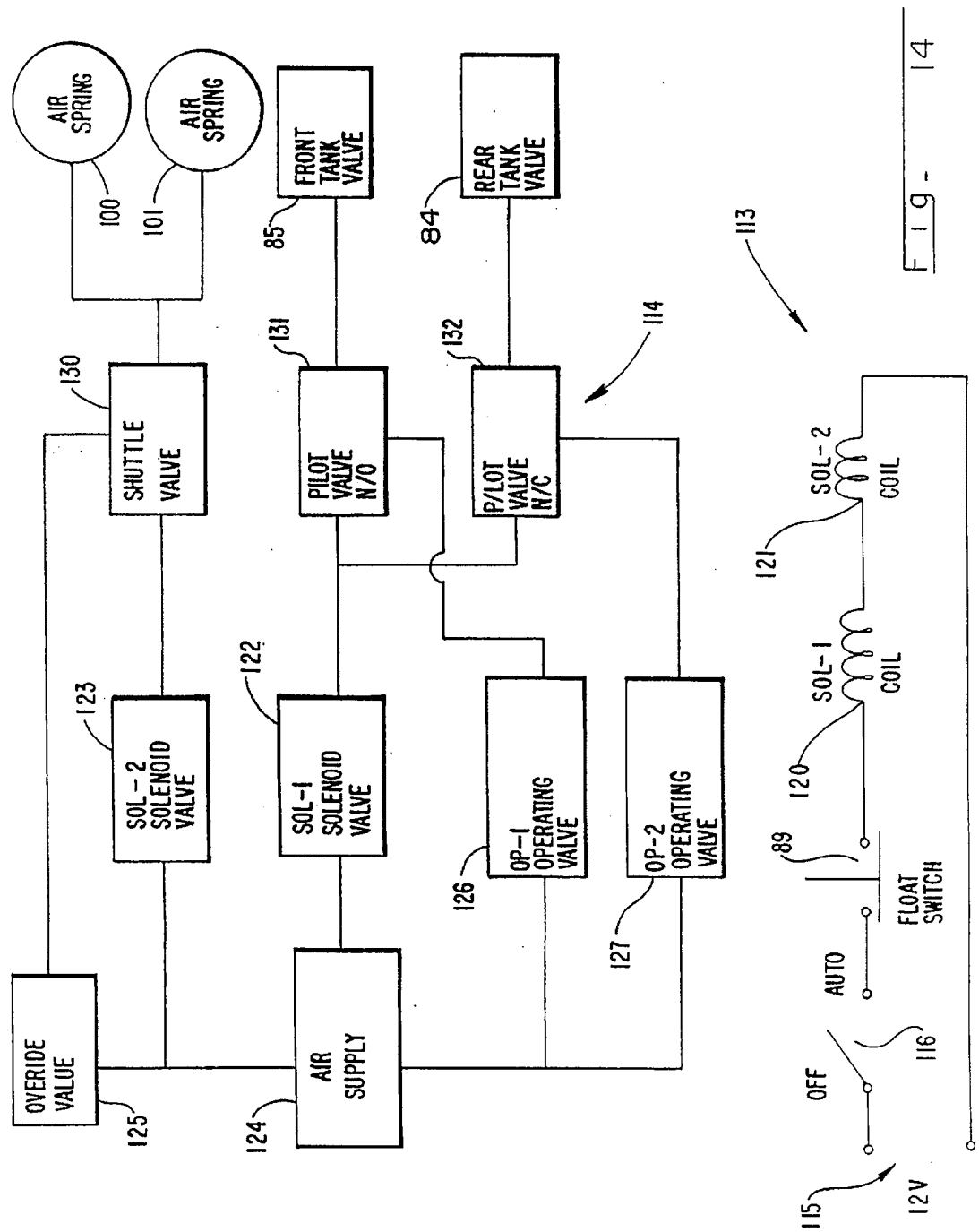
FIG. 14 is a schematic view of the air and electric systems employed with the tank truck herein; and In connection with the trucks and the various components per se as noted in the drawings and referred to in the description, for example, wheels, axles, frames, driver cabins, transmission, etc., are of conventional structure and therefore it is unnecessary to refer to the structural details.

FIG. 14 schematically illustrates an air/electrical system for causing the tag wheels to be moved up and down. Before commenting on the system, it is pointed out that while I have shown the tanks to have two independent compartments, it is within the purview of the invention to provide for more than two compartments.

An electrical circuit for operating the system is indicated at 113 and the air system indicated at 114.

The electrical circuit includes a 12 volt d.c. source 115, a switch 116 which can be set in an off position or an automatic position, the float switch 89, the Sol-1 coil 120 and the Sol-2 coil 121.

The coils 120 and 121 are respectively for Sol-1 solenoid valve 122 and for the Sol-2 solenoid valve 123.

The air supply is indicated at 124 and feeds the inlet of an override valve 125, the inlet of the Sol-1 solenoid valve 122, the inlet of the Sol-2 solenoid valve 123, the inlet of OP-1 operating valve 126, and the inlet of the OP-2 operating valve 127.

The outlet of the valve 123 is connected to one inlet of a shuttle valve 130. The other inlet of the shuttle valve 130 is connected to the outlet of the override valve 125. The outlet of the shuttle valve 130 is connected to the air springs 100 and 101. The shuttle has an exhaust port not shown.

The outlet of the SOL-1 solenoid 122 is connected to the inlet of pilot valve 131 (which is normally open) and is also connected to the inlet of the pilot valve 132 (which is normally closed).

The outlets of the pilot valves 131 and 132 are connected respectively to the front tank valve 85 and the rear tank valve 84.

The outlet of the OP-1 operating valve is connected to another of the inlets of pilot valve 131. The outlet of the OP-2 operating valve 127 is connected to another of the inlets of the pilot valve 132.

As will be apparent the conventional items of FIG. 14 function in their respective normal ways for loading and unloading the front and rear compartment 21 and 22.

The system is operated by manually manipulating the operating valves 126 and 127 and the solenoid valves 122 and 123 whose opening and closing is dictated by the energizing and deenergizing of the coils 120 and 121 so that the front and rear tank valves 85 and 84 will be closed for loading the compartments and respectively opened for unloading. The switch 116 is turned to the "off" position for loading and to the "auto" position for the float switch to control the energizing/deenergizing of the coils 120 and 121 for causing the air spring to be deflated so the tag wheels are lifted and for the front compartment to be drained under that condition.

The purpose of the override valve 125 is for situations where turning off the engine ignition cuts out the truck electrical system, which can cause the air springs to deflate and the tag wheels to rise. It would not be appropriate to load both the front and rear compartments with the lift wheels up.

Therefore, in such cases the override valve is actuated to condition the shuttle valve 130 to cause air to be delivered to air springs 100.

It will be apparent that the air/electric circuit can be set up with a pilot light which illuminates at the time the float switch contacts open to alert the driver to switch from the rear compartment 86 to the front compartment 85. The operating valves are arranged to accommodate this manual changing of compartments.

As noted above, it is within the purview of the invention to provide for more than two compartments. The components to be used in the more-than-two compartments arrangement are structural duplicates of what is disclosed in FIGS. 1–10 and occupy corresponding places in the air/electrical scheme of FIG. 14 as made explicit below.

The rear tank section 22 (FIG. 8) may be provided with a bulkhead in place of the baffle 75 to divide the section 22 into two independent compartments, the first or rearward compartment being adjacent the rear end 71 and the second or forward compartment being adjacent the front tank section 21. The pump/valve assembly or rear tank valve 84 remains in the forward compartment. The rearward compartment will be provided with a pump/valve assembly like the pump/valve assembly 84. The sensor or float valve 89 remains in place in the forward compartment and a similar sensor is connected in the rearward compartment. The pump/valve assembly in the rearward compartment will be connected to the manifold 52 similarly as shown for valve 84 in FIG. 10. A float switch controlled by the sensor in the rearward compartment is connected in series with the float switch 89 shown in FIG. 14.

Also, with reference to FIG. 14, a solenoid valve (like valves 122, 123), an operating valve (like valves 126, 127), a pilot valve (like valve 131, 132) are connected between the air supply 124 and the new tank valve in the rearward compartment. A coil to control the solenoid valve for the rearward compartment is put in series with the coils 120 and 121.

As mentioned heretofore, a pilot light can be illuminated by action of float switch contacts to alert the driver to switch from the front tank section to the rear tank section and that the operating valves can arranged to accommodate the manual changing. A simplified version employs conventional air or cable.

In the air arrangement, an air valve (lever or knob operated) is connected between the air supply and the front tank valve.

Preferably air valve is located in the driver's cabin. By moving the lever to one position, air is admitted to the front tank valve to open the same. When the lever is moved to another position the air is vented and a spring closes the front tank valve. In the cable arrangement, the conventional lever/cable in the tank truck is employed. When the lever is moved to one position, the front tank valve is opened and when moved to another position the valve is closed. The lever is normally cabin mounted.

Where the vehicle has a single rear tank section, the sensor in the tank functions to activate a pilot light or other driver alert means in the driver's cabin. At that time, the rear tank valve in the rear tank section is actuated by an air valve or a cable lever in the driver's cabin.

Where the vehicle has a rear tank section comprising a pair of compartments, a sensor in each compartment functions to activate a pilot light or other driver alert means in the cabin. Air valves or cable levers in the cabin are connected with the respective valves in the compartments. When the forward compartment is substantially void of liquid, the driver is alerted to switch to the rearmost compartment.

In either the single rear tank or dual rear compartment arrangements, the driver is also alerted to lift the tag wheels. In the arrangements under discussion, the air supply to the air springs for the tag wheels is controlled by an air valve which is manually operated by the driver. This air valve admits air to the air springs to lower the tag wheels or exhausts the air so that the springs lift the tag wheels.

It will be apparent that for the driver alert means not only includes pilot lights but other conventional devices such as audio buzzers and air-operated flags.

I claim:

1. A tank truck including a front end and a rear end for traversing roads to deliver liquid in the form of refined petroleum product and having a tank including a front section for receiving, storing, and discharging said liquid, a rear section for receiving, storing, and discharging said liquid independent of the front section, and a wheel assembly mounted between the front end and the rear end arrangeable, in tandem axle or single axle configuration for supporting the tank, in the single or tandem axle configuration, the subcombination for effecting said rear tandem axle and rear single axle configurations:

mechanism to provide for said wheel assembly to support the tank by a tandem axle configuration of a predetermined wheel base or by a single axle configuration of a shorter wheel base; and a sensor connected with said rear tank section and operable as a function of the amount of liquid stored in the rear tank section to cause said mechanism to support the tank in said tandem axle configuration and to cause said mechanism to support the tank in said single axle configuration.

2. The tank truck of claim 1 wherein said rear tank section is comprised of a plurality of compartments.

3. In a tank truck for traversing roads to deliver liquid in the form of refined petroleum product, the subcombination comprising:

an elongated frame having a front end and a rear end;

a pair of steering wheels connected adjacent said front end for use in steering the tank truck;

a driver's cab mounted on said frame adjacent the front end thereof and above said pair of steering wheels;

at least one pair of drive wheels connected to said frame in a position inboard of said rear end for use in driving the tank truck;

a tank mounted on said frame and a having front section for receiving, storing, and discharging liquid and having a rear section for receiving, storing, and discharging independent of the front section;

a pair of tag wheels;

lift mechanism connecting said tag wheels to said frame below said rear section and inboard of said rear end and between said rear end and said drive wheels and operable to support the tag wheels in a down condition or in an up condition;

in said down condition, said lift mechanism supporting said tag wheels to engage the surface of a road and in the up condition said lift mechanism supporting said tag wheels to be spaced above the surface of the road;

a sensor connected with said rear section to determine when the rear section is substantially void of liquid;

a driver alert mechanism positioned at least in said driver's cab and connected with said sensor and activated to alert the driver that the rear tank section is substantially void of liquid;

a liquid pump connected to said front tank section and to said rear tank section and having an operating condition pumping liquid out of the rear section while liquid in the front section remains stored therein and having an operating condition for pumping liquid out of the front section when the rear section is substantially void of liquid, the liquid pump including mechanism to be manually actuated by the vehicle driver to cause said operating conditions; and a control connected with said lift mechanism and having mechanism to be manually actuated by the vehicle driver to cause the lift mechanism to operate to support said tag wheels in said up condition when said rear tank section is substantially void of liquid.

4. The subcombination of claim 3 further including a bumper interconnected to said rear end to protect the rear end, the horizontal distance between the rear of the bumper and the rotational axis of the drive wheels constituting a rear overhang and said distance being not more than 124 inches.

5. In a tank truck for traversing roads to deliver liquid in the form of refined petroleum product, the subcombination comprising:

an elongated frame having a front end and a rear end;

a pair of steering wheels connected adjacent said front end for use in steering the tank truck;

a driver's cab mounted on said frame adjacent the front end thereof and above said pair of steering wheels;

at least one pair of drive wheels connected to said frame in a position inboard of said rear end for use in driving the tank truck;

a tank mounted on said frame and having a front section for receiving, storing, and discharging liquid and having a rear section for receiving, storing, and discharging liquid independent of the front section, the front section terminating in a position to provide a space between the front section and said driver's cab;

a hose reel assembly for delivering liquid mounted in said space and interconnected with said front section and said rear section for receiving fluid therefrom;

a pair of tag wheels;

lift mechanism connecting said tag wheels to said frame below said rear section inboard of said rear end and between said rear end and said drive wheels and operable to support the tag wheels in a down condition or in an up condition;

in said down condition, said lift mechanism supporting said tag wheels to engage the surface of a road and in the up condition said lift mechanism supporting said tag wheels to be spaced above the surface of the road; and a sensor connected with said rear section to sense the fluid level inside of the rear section.

6. The subcombination of claim 5 further including a bumper interconnected to said rear end to protect the rear end, the horizontal distance between the rear of the bumper and the rotational axis of the drive wheels constituting a rear overhang and said distance being not more than 124 inches.

7. In a tank truck for traversing roads to deliver liquid in the form of refined petroleum product, the subcombination comprising:

an elongated frame having a front end and a rear end;

a pair of steering wheels connected adjacent said front end for use in steering the tank truck;

a driver's cab mounted on said frame adjacent the front end thereof and above said pair of steering wheels;

at least one pair of drive wheels connected to said frame in a position inboard of said rear end for use in driving the tank truck;

a tank mounted on said frame and having a front section for receiving, storing, and discharging liquid and having a rear section for receiving, storing, and discharging liquid independent of the front section;

a pair of tag wheels;

lift mechanism connecting said tag wheels to said frame below said rear section inboard of said rear end and between said rear end and said drive wheels and operable to support the tag wheels in a down condition or in an up condition;

in said down condition, said lift mechanism supporting said tag wheels to engage the surface of a road and in the up condition said lift mechanism supporting said tag wheels to be spaced above the surface of the road;

a sensor connected with said rear tank section and operable to sense when the rear tank section is substantially void of liquid and operable to sense when the rear tank section is not substantially void of liquid;

a liquid pump connected to said front tank section and to said rear tank section and (a) when said sensor has sensed that the rear tank section is not substantially void of liquid being operable for pumping liquid out of said rear tank section while the liquid in the front tank section remains stored therein and (b) when said sensor has sensed that the rear tank section is substantially void of liquid being operable for pumping liquid out of the front tank section; and a control connected with said lift mechanism and operable when said sensor has sensed that said rear tank section is substantially void of liquid to cause the lift mechanism to support said tag wheels in said up condition.

8. The subcombination of claim 7 further including a bumper interconnected to said rear end to protect the rear end, the horizontal distance between the rear of the bumper means and the rotational axis of the drive wheels constituting a rear overhang and said distance being not more than 124 inches.

9. The subcombination of claim 3 wherein said sensor is a float valve and said driver alert mechanism is a pilot light.

10. In a tank truck for traversing roads to deliver liquid in the form of refined petroleum product, the subcombination comprising:

a tank including a front tank section to hold liquid and a rear tank section to hold said liquid independently of the front tank section, the front tank section having a rearmost end adjacent the rear tank section;

a pair of steering wheels positioned forward of said front tank section for supporting said tank and for steering the tank truck;

at least one pair of drive wheels supporting said tank and being for use in driving the tank truck and being positioned below and adjacent to the rearmost end of said front tank section;

a pair of tag wheels positioned below said rear tank section;

a sensor connected with said rear tank section;

lift mechanism mounting said tag wheels and operable to support the tag wheels in a down position or in an up position as a function of the amount of liquid in said rear tank section, the amount of liquid in said rear tank section means being determined by said sensor; and in said down position, said rear tank section and front tank section each having a predetermined quantity of liquid and in said up position, the rear tank section being substantially void of liquid.

11. The tank truck of claim 10 wherein said rear tank section is comprised of a plurality of compartments.

12. In a tank truck for traversing roads to deliver liquid in the form of refined petroleum product including elongated frame having a front end and a rear end, a pair of steering wheels connected with the frame for steering the vehicle, a power drive mounted on said frame in a position adjacent said front end, the power drive including an engine, a transmission, and a drive shaft, the drive shaft extending in a direction toward said rear end, and a driver's cab mounted on said frame adjacent the front end thereof and above said pair of steering wheels, the improvement which comprises:

a tag axle connected to said frame in a position adjacent to and inboard of said rear end and supporting a pair of tag wheels;

a drive axle supporting a pair of drive wheels and connected to said frame in a position between said steering and tag wheels and adjacent said tag axle, the drive wheels being connected to said drive shaft to be driven thereby;

a tank mounted on said frame and extending from said rear end toward said front end and terminating in a position between said steering and drive wheels to provide a space between said tank and said driver's cab;

a bulkhead inside of said tank and separating the inside of the tank into a rear compartment and a front compartment, the bulkhead being located at least in part in a position between said tag and drive wheels so that the rear compartment is disposed above the tag wheels;

lift mechanism connecting said tag axle and said frame and operable to support the tag axle in a down condition or in an up condition;

in said down condition, the tag axle supporting said pair of tag wheels to engage the road when the drive and steering wheels engage the road;

in said up condition, the tag axle supporting said pair of tag wheels to be spaced above the road while the drive and steering wheels engage the road; and a sensor connected to said lift mechanism and disposed inside said rear compartment to sense the level of liquid in the rear compartment and provide a signal to the lift mechanism to cause the lift mechanism to support the tag axle in the up condition as a function of said level.

13. In a tank truck for traversing roads to deliver liquid in the form of refined petroleum product including an elongated frame having a front end and a rear end, a steering axle connected to said frame adjacent the front end thereof and having pair of steering wheels for steering the truck, a power drive mounted on said frame means in a position adjacent said steering axle, the power drive including an engine, a transmission, and a drive shaft, the drive shaft extending in a direction toward said rear end, and a driver's cab mounted on said frame adjacent the front end thereof and above said pair of steering wheels, the improvement which comprises:

a tag axle connected to said frame in a position adjacent to and inboard of said rear end and supporting a pair of tag wheels;

a drive axle supporting at least one pair of drive wheels and connected to said frame in a position between said steering and tag axles and adjacent the tag axle, a pair of the drive wheels being connected to said drive shaft to be driven thereby;

a tank mounted on said frame and extending from said rear end toward said front end and terminating in a position between said steering and drive axles to provide a space between said tank and said drivers cab;

a bulkhead inside of said tank means and separating the inside of the tank into a rear compartment and a front compartment, the bulkhead being located at least in part in a position between said tag and drive axles so that the rear compartment is disposed above said tag axle;

lift mechanism connecting said tag axle and said frame means and operable to support the tag axle in a down condition or in an up condition;

in said down condition, the tag axle supporting said pair of tag wheels to engage the road when the steering and drive wheels engage the road;

in said up condition, the tag axle supporting said pair of tag wheels to be spaced above the road while the steering and drive wheels engage the road; and a sensor connected to said lift mechanism and disposed inside said rear compartment to sense the level of liquid in the rear compartment and provide a signal to the lift mechanism to cause the lift mechanism to support the tag axle in the up condition as a function of said level.

14. A tank truck for traversing roads to deliver liquid in the form of refined petroleum product comprising:

a tank including a front tank section to hold said liquid and a rear tank section to hold said liquid independently of the front tank section;

a wheel assembly including drive wheels and tag wheels for supporting said tank in a tandem axle configuration or in a single axle configuration;

in said tandem axle configuration, the tag wheels being mounted below said rear tank section, said drive wheels and said tag wheels each being supported to engage the surface of a road and in said single axle configuration, said drive wheels being supported to engage the surface of a road and said tag wheels being supported to be spaced above the surface of a road;

a liquid pump connected to said front tank section and to said rear tank section for pumping fluid out of each section; and a control connected with said liquid pump and controlling the liquid pump to pump fluid from said front tank section or from said rear tank section means;

a sensor connected with said rear tank section to sense the fluid level inside of the rear tank section.

15. In a tank truck for traversing roads to deliver liquid in the form of refined petroleum product including an elongated frame having a front end and a rear end, a pair of steering wheels connected with the frame for steering the vehicle, a power drive mounted on said frame in a position adjacent said front end, and a driver's cab mounted on said frame adjacent the front end thereof, the improvement which comprises:

at least one pair of drive wheels connected to said frame in a position inboard of said rear end and connected to said power drive to be driven thereby for use in driving the tank truck;

a bumper interconnected to said rear end to protect the rear end, the horizontal distance between the rear of the bumper and the rotational axis of the drive wheels constituting the rear overhang and said distance being not more than 124 inches;

a tank for receiving, holding, and discharging said fluid mounted on said frame and extending from said rear end toward said front end and terminating in a position between said steering wheels and said drive wheels to provide a space between said tank and said driver's cab;

a hose reel assembly for delivering liquid mounted in said space and interconnected to said tank for receiving liquid therefrom;

said tank including a front tank section to hold said liquid and a rear tank section to hold said liquid independently of the front tank section the rear tank section being disposed above said rear overhang;

a pair of tag wheels;

lift mechanism connecting said tag wheels to said frame means in a position below said rear tank section between said rear end and said drive wheels and operable to support the tag wheels in a down condition or in an up condition;

in said down condition, said lift mechanism supporting said tag wheels to engage the surface of a road and in the up condition said lift mechanism supporting said tag wheels to be spaced above the surface of the road; and a sensor connected to said lift mechanism and disposed inside said rear tank section to sense the level of liquid in the rear tank section and provide a signal to the lift mechanism to cause the lift mechanism to support the tag axle in the up condition as a function of said level.

16. The subcombination of claim 15 wherein the horizontal distance between the said rear end of said frame and the rotational axis of said drive wheels constitutes a rear overhang and said distance not being substantially not more than 124 inches.

17. A tank truck including a front end and a rear end for traversing roads to deliver liquid in the form of refined petroleum product comprising:

a tank including a front tank section to hold said liquid and a rear tank section to hold said liquid independently of the front tank section, the rear tank section being comprised of a plurality of compartments holding fluid independently of each other;

a wheel assembly mounted between said front and rear ends including drive wheels and tag wheels for supporting said tank in a tandem axle configuration or in a single axle configuration;

in said tandem axle configuration, said drive wheels and said tag wheels each being supported to engage the surface of a road and in said single axle configuration, said drive wheels being supported to engage the surface of a road and said tag wheels being supported to be spaced above the surface of a road;

a liquid pump connected to said front tank section and to each compartment of said rear tank section for independently pumping fluid out of each compartment;

means to cause said liquid pump to pump fluid from said front tank section or from any one of said compartments in said rear tank section;

a plurality of sensors respectfully connected to said compartments to sense the fluid level therein.

18. In a tank truck for traversing roads to deliver liquid in the form of refined petroleum product, the subcombination comprising:

a tank including a front tank section to hold liquid and a rear tank section to hold said liquid independently of the front tank section means, the rear tank section being comprised of a plurality of compartments holding fluid independently of each other;

a pair of steering wheels positioned forward of said front tank section for supporting said tank and for steering the tank truck;

at least one pair of drive wheels supporting said tank and being for use in driving the tank truck;

a pair of tag wheels positioned below said rear tank section;

a plurality of sensors respectively connected with said compartments of said rear tank section;

mechanism mounting said tag wheels and operable to support the tag wheels in a down position or in an up position as a function of the amount of liquid in said rear tank section, the amount of liquid in said rear tank section being determined by the sensors connected with the rear tank section; and in said down position, said rear tank section and said front tank section each having a predetermined quantity of liquid and in said up position, the rear tank section being substantially void of liquid.

19. In a tank truck for traversing roads to deliver liquid in the form of refined petroleum product, the subcombination comprising:

an elongated frame having a front end and a rear end;

a pair of steering wheels connected adjacent said front end for use in steering the tank truck;

a driver's cab mounted on said frame adjacent the front end thereof and above said pair of steering wheels;

at least one pair of drive wheels connected to said frame in a position inboard of said rear end for use in driving the tank truck;

a tank mounted on said frame and having a front tank section for receiving, storing, and discharging liquid and having a rear tank section for receiving, storing, and discharging liquid independent of the front tank section, the rear tank section being comprised of first and second compartments holding fluid independently of each other, the first compartment being adjacent said rear end and the second compartment being adjacent the front tank section;

a pair of tag wheels;

lift mechanism connecting said tag wheels to said frame below said rear tank section inboard of said rear end and between said rear end and said drive wheels and operable to support the tag wheels in a down condition or in an up condition;

in said down condition, said lift mechanism supporting said tag wheels to engage the surface of a road and in the up condition said lift mechanism supporting said tag wheels to be spaced above the surface of the road;

first and second sensors respectively connected with said first and second compartments and each operable to sense when the compartment to which it is connected is substantially void of liquid;

a first pilot light in said driver's cab and electrically connected with first said sensor;

a second pilot light in said drivers's cab and electrically connected with said second sensor;

said electrical connections providing for said first pilot light to be illuminated when the first sensor has sensed that the first compartment is substantially void of liquid and providing for said second pilot light to be illuminated when the second compartment is substantially void of liquid.

20. In a tank truck for traversing roads to deliver liquid in the form of refined petroleum products, the subcombination comprising:

an elongated frame having a front end and a rear end;

a pair of steering wheels connected adjacent said front end for use in steering the tank truck;

a driver's cab mounted on said frame adjacent the front end thereof and above said pair of steering wheels;

at least one pair of drive wheels connected to said frame in a position inboard of said rear end for use in driving the tank truck;

a tank mounted on said frame and having a front tank section for receiving, storing, and discharging liquid and having a rear tank section for receiving, storing, and discharging liquid independent of the front tank section, the rear tank section being comprised of a plurality of compartments holding fluid independently of each other;

a pair of tag wheels;

lift mechanism connecting said tag wheels to said frame below said rear tank section inboard of said rear end and between said rear end and said drive wheels and operable to support the tag wheels in a down condition or in an up condition;

in said down condition, said lift mechanism supporting said tag wheels to engage the surface of a road and in the up condition said lift mechanism supporting said tag wheels to be spaced above the surface of the road;

a plurality of sensors resepectively connected with said compartments and each operable to sense when the compartment to which it is connected is substantially void of liquid;

a plurality of pilot lights in said driver's cab and each respectively, electrically connected with a sensor in a compartment; and said electrical connections providing for said pilot light to be illuminated when the sensor to which the pilot light is connected has sensed that the compartment is substantially void of liquid.

21. In a tank truck for traversing roads to deliver liquid in the form of refined petroleum product, the subcombination comprising:

an elongated frame having a front end and a rear end;

a pair of steering wheels connected adjacent said front end for use in steering the tank truck;

a driver's cab mounted on said frame adjacent the front end thereof and above said pair of steering wheels;

at least one pair of drive wheels connected to said frame in a position inboard of said rear end for use in driving the tank truck;

a tank mounted on said frame and having a front section for receiving, storing, and discharging liquid and having a rear section for receiving, storing, and discharging liquid independent of the front section;

a pair of tag wheels;

lift mechanism connecting said tag wheels to said frame below said rear section and inboard of said rear end and between said rear end and said drive wheels and operable to support the tag wheels in a down condition or in an up condition;

in said down condition, said lift mechanism supporting said tag wheels to engage the surface of the road and in the up condition said lift mechanism supporting said tag wheels to be spaced above the surface of the road;

a sensor connected with said rear section to determine when the rear section means is substantially void of liquid;

driver alert mechanism positioned at least in said driver's cab and connected with said sensor and activated to alert the driver that the rear tank section is substantially void of liquid;

a front tank valve connected with said front tank section and having a closed condition and an open condition;

a rear tank valve connected with said rear tank section and having closed condition and an open condition;

a control connected with said front tank valve which can be manually activated by the vehicle driver for opening and closing said front tank valve;

a control connected with said rear tank valve which can be manually actuated by the vehicle driver for opening and closing said rear tank valve;

a control connected with said lift mechanism which can be manually actuated by the vehicle driver for causing the lift mechanism to support said tag wheels in said up condition when said rear tank section means is substantially void of liquid.

22. The subcombination of claim 21 wherein said driver alert mechanism is an audio device.

23. The subcombination of claim 21 wherein said driver alert mechanism is a pilot light.

24. In a tank truck for traversing roads to deliver liquid in the form of refined petroleum product, the subcombination comprising:

an elongated frame having a front end and a rear end;

a pair of steering wheels connected adjacent said front end for use in steering the tank truck;

a driver's cab mounted on said frame adjacent the front end thereof and above said pair of steering wheels;

at least one pair of drive wheels connected to said frame in a position inboard of said rear end for use in driving the tank truck;

a tank mounted on said frame and having a front tank section for receiving, storing, and discharging liquid and having a rear tank section for receiving, storing, and discharging liquid independent of the front tank section, the rear tank section being comprised of at least first and second compartments holding fluid independently of each other, the first compartment being adjacent said rear end and the second compartment being adjacent the front tank section;

a pair of tag wheels;

lift mechanism connecting said tag wheels to said frame below said rear tank section inboard of said rear end and between said rear end and said drive wheels and operable to support the tag wheels in a down condition or in an up condition;

in said down condition, said lift mechanism supporting said tag wheels to engage the surface of a road and in the up condition said lift mechanism supporting said tag wheels to be spaced above the surface of the road;

first and second sensors respectively connected with said first and second compartments and each operable to sense when the compartment to which it is connected is substantially void of liquid;

first driver alert mechanism connected with first said sensor to alert the driver that said first compartment is substantially void of liquid;

second driver alert mechanism connected with second said sensor to alert the driver that said second compartment is substantially void of liquid;

a front tank valve connected with said front tank section and having a closed condition and an open condition;

a control connected with said front tank valve which can be manually actuated by the vehicle driver for opening and closing the front tank valve;

a first rear tank valve connected with said rear tank section and having a closed condition and an open condition;

a control connected with said first rear tank valve means which can be manually actuated by the vehicle driver for opening and closing the first rear tank valve;

a second rear tank valve connected with said second rear tank which can be manually actuated by the vehicle driver for opening and closing the second rear tank valve;

a control connected with said second rear tank to be manually activated by the vehicle driver to open and close the second rear tank valve; and a control connected with said lift mechanism to be manually operated by the vehicle driver to cause the lift mechanism to support said tag wheels in said up condition when said rear tank section means is substantially void of liquid.

* * * * *